(12) United States Patent
Dai et al.

(10) Patent No.: US 8,917,030 B2
(45) Date of Patent: Dec. 23, 2014

(54) ELECTRONIC BALLAST FOR LIGHTING UNIT AND LIGHTING APPARATUS

(75) Inventors: Hong Dai, Guangzhou (CN); Yuancheng Guo, Guangdong (CN); Wei Gao, Guangzhou (CN); Changsong Ma, Guangdong (CN)

(73) Assignee: OSRAM GmbH, Munich (DE)

( * ) Notice: Subject to any disclaimer, the term of this patent is extended or adjusted under 35 U.S.C. 154(b) by 26 days.

(21) Appl. No.: 13/821,596

(22) PCT Filed: Aug. 25, 2011

(86) PCT No.: PCT/EP2011/064625
§ 371 (c)(1),
(2), (4) Date: Mar. 8, 2013

(87) PCT Pub. No.: WO2012/031902
PCT Pub. Date: Mar. 15, 2012

(65) Prior Publication Data
US 2013/0169185 A1    Jul. 4, 2013

(30) Foreign Application Priority Data

Sep. 10, 2010   (CN) .......................... 2010 1 0280145

(51) Int. Cl.
*H05B 37/02*  (2006.01)
*H05B 41/36*  (2006.01)
*H05B 41/282* (2006.01)

(52) U.S. Cl.
CPC ............ *H05B 41/36* (2013.01); *H05B 41/2825* (2013.01); *Y02B 20/185* (2013.01)
USPC ........... 315/224; 315/247; 315/276; 315/283; 315/291

(58) Field of Classification Search
CPC ...... H05B 37/02; H05B 41/042; H05B 41/26; H05B 41/28; H05B 41/2885; H05B 41/2828
USPC ............ 315/224, 225, 226, 227 R, 247, 276, 315/283, 291, 299, DIG. 7
See application file for complete search history.

(56) References Cited

U.S. PATENT DOCUMENTS

| 5,177,408 | A | 1/1993 | Marques |
| 5,565,740 | A | 10/1996 | Hiramatsu et al. |
| 5,650,925 | A | 7/1997 | Hestermann |
| 6,181,079 | B1* | 1/2001 | Chang et al. ................... 315/247 |
| 6,700,331 | B2* | 3/2004 | Benensohn ................... 315/224 |
| 7,061,188 | B1 | 6/2006 | Katyl et al. |
| 2013/0307429 | A1* | 11/2013 | Xue et al. ...................... 315/206 |

FOREIGN PATENT DOCUMENTS

WO    9639009  A1   12/1996

* cited by examiner

*Primary Examiner* — Thuy Vinh Tran

(57) ABSTRACT

An electronic ballast for a lighting unit may include a Power Factor Correction (PFC) circuit, an inverter, and a control circuit for controlling startup of the inverter, wherein the control circuit is coupled between the PFC circuit and the inverter and includes a switching device coupled in a startup loop for the inverter; a unidirectional conductive device coupled between a PFC power supply circuit for providing an operation current to a PFC controller of the PFC circuit and an input of the PFC controller for preventing a startup current flowing through the PFC circuit from triggering the switching device; and a triggering device coupled to the switching device and a connection point between the unidirectional conductive device and the PFC power supply circuit for controlling switch-on and switch-off of the switching device.

10 Claims, 2 Drawing Sheets

ELECTRONIC BALLAST FOR LIGHTING UNIT AND LIGHTING APPARATUS

RELATED APPLICATIONS

The present application is a national stage entry according to 35 U.S.C. §371 of PCT application No.: PCT/EP2011/064625 filed on Aug. 25, 2011, which claims priority from Chinese application No.: 201010280145.3 filed on Sep. 10, 2010.

TECHNICAL FIELD

Various embodiments relate to the field of lighting. By way of example, various embodiments relate to an electronic ballast for a lighting unit, and a lighting apparatus including the electronic ballast.

BACKGROUND

Instant startup electronic ballast circuit for a fluorescent lamp mainly includes an Active Power Factor Correction (APFC) circuit, and an inverter with an arrangement such as half-bridge. FIG. 1 is a schematic diagram illustrating an electronic ballast circuit 100 of the prior art. With reference to FIG. 1, the electronic ballast circuit 100 includes a rectifier 110, a Power Factor Correction (PFC) circuit 120 for adjusting a power factor, reservoir capacitors C5 and C6, an inverter 140 and an output circuit 150. The rectifier 110 is connected to an Alternating Current (AC) power supply V1, and converts AC electricity into Direct Current (DC) electricity. The PFC circuit 120 adjusts the power factor of an AC input, so as to obtain a DC bus voltage $V_{BUS}$ across the reservoir capacitors C5 and C6. The inverter 140 receives DC input power from the reservoir capacitors C5 and C6, and converts the DC input power into AC output power. The output circuit 150 receives the AC output power from the inverter 140, so as to supply a current for driving at least one load, e.g. the gas discharge lamp.

The rectifier 110 is a full-bridge rectifier, which is composed of diodes D1-D4 and a filtering capacitor C1, so as to convert the AC electricity inputted from the AC power supply V1 into the DC electricity, e.g. an 110 VAC into 150 VDC or a 220 VAC into 300 VDC.

The PFC circuit 120 performs PFC, i.e. input current shaping, which can be implemented in many different manners. The general manner to implement is to use a boost transformer. As shown in FIG. 1, the PFC circuit 120 includes: a PFC startup circuit for providing a startup voltage used to start an operation of the PFC circuit 120 by receiving an input voltage, which, for example, includes a resistor R1 and a PFC power-supply capacitor C3 connected in series between an output of the rectifier 110 and a grounded terminal; a transformer (e.g. the boost transformer) including a primary winding L2A and a grounded secondary winding L2B; a charge pump circuit which, for example, includes a capacitor C2, a resistor R2, a diode D6 and a voltage stabilizing diode D7, where an end of the charge pump circuit is connected to the secondary winding L2B; a PFC controller U1 (e.g. an integrated circuit chip numbered L6562) having an input VCC and an output GD, where the input VCC thereof receives the startup voltage from the PFC startup circuit and an operation voltage provided by a PFC power supply circuit which is composed of the charge pump circuit and the secondary winding L2B; and a PFC switch Q1, which is coupled between the primary winding L2A and the ground and is controlled by a signal outputted from the output GD of the PFC controller U1. For example, the PFC switch Q1 is a Metal Oxide Semiconductor Field Effect Transistor (MOSFET).

After the ballast is powered up, the input voltage (e.g. a rectified sine wave) charges the PFC power-supply capacitor C3 through the resistor R1. When the voltage across the capacitor C3 reaches a threshold voltage for the operation of the PFC controller U1, the PFC controller U1 begins to operate and outputs a drive signal for turning on the PFC switch Q1. At this time, a high-frequency current begins to flow through the primary winding L2A, and an induced electromotive force is produced on the secondary winding L2B, so as to provide the operation voltage for the PFC controller U1 through the charge pump circuit. The high-frequency current flowing through the primary winding L2A forces a forward biased diode D5 to be conducted, so as to charge the reservoir capacitors C5 and C6. The forward biased diode D5 is used to prevent the current from circulating between the capacitor C1 of the bridge rectifier 110 and the reservoir capacitors C5 and C6 (for storing electricity energy required for lighting of the gas discharge lamp). In the PFC circuit 120, the PFC switch Q1 is turned on for a fixed period of time by the PFC controller U1, or alternatively, once the current flowing through the primary winding L2A reaches a certain value in direct proportion to the input voltage, the PFC switch Q1 is turned off by the PFC controller U1, so as to implement the PFC.

As shown in FIG. 1, the inverter 140 is configured in a half-bridge form comprising two inverter switches Q2 and Q3. The inverter switch Q2 is coupled between a first output and an input of the inverter 140. The inverter switch Q3 is coupled between the first output and the ground of the circuit. The inverter switches Q2 and Q3 are appropriate power switching devices such as NPN bipolar transistors.

When the PFC circuit 120 is started up, the DC bus voltage $V_{BUS}$ charges a startup capacitor C8 of the inverter through a resistor R6. When the voltage across the startup capacitor C8 reaches a breakdown voltage of a voltage breakdown device such as a bidirectional trigger diode DB3 (D16), the bidirectional trigger diode DB3 gets through, a voltage drop thereon decreases quickly, and the charges stored in the startup capacitor C8 are released quickly through the bidirectional trigger diode DB3, so as to provide a startup current for activating the switch Q3, thereby starting a self-oscillation operation of the inverter 140. The DC current charging the startup capacitor C8 through the resistor R6 is released by the high-frequency switch Q3 through a diode D15, so as to avoid it disturbs the normal operation of the half bridge by charging again and triggering the bidirectional trigger diode DB3. Hereto, the ballast completes the startup, and begins normal operation.

During the normal operation, the switches Q2 and Q3 are turned on and off alternately by a drive signal, i.e. the switch Q3 is turned off when the switch Q2 is turned on, and vice versa. The drive signal is provided by two secondary windings T1C and T1D of an output transformer T1. A high-frequency output voltage of the inverter 140 for igniting the discharge lamp coupled between a first output connection J9 and at least one second output connection J4, J5, J6 and J7 is provided to the output circuit 150 by a primary winding T1B magnetically coupled to a secondary winding T1A.

When the AC power supply V1 is cut off, the half bridge performs damped oscillation due to the gradually decreased voltage across the reservoir capacitors C5 and C6, and stops the oscillation until the driving is insufficient.

There are three problems in the electronic ballast circuit of the prior art.

1. After power is cut off and the apparatus is shut down, the damped oscillation by the half bridge cannot consume the full energy stored in the reservoir capacitors C5 and C6. This leads to the following actions after the stop of the oscillation performed by the half bridge: the startup capacitor C8 is charged again and triggers the bidirectional trigger diode DB3, the inverter 140 is started up again, and part of the discharge lamps is ignited instantaneously and produces twinkling.

2. This circuit operates in a wide voltage range such as 120V to 277V or 347V to 480V. Upon the startup of the circuit, there is a situation that the inverter 140 is started up earlier than the PFC circuit, i.e. a speed of charging the startup capacitor C8 to a threshold voltage for starting the inverter is greater than a startup speed of the PFC circuit. In this case, the inverter 140 is started up before the bus voltage reaches the rated value. As such, the output voltage (across the primary winding T1B) of the output transformer T1 cannot reach the rated value. Thus, the startup time and startup current of the discharge lamp cannot meet requirements in ANSI82.11, which has an adverse effect on the discharge lamp's life.

3. For the PFC circuit of this type, there exists an issue of output voltage overshooting (the output voltage exceeds the rated value for a short period of time) upon the startup or when the load changes. If the inverter 140 is started up during the time of the bus voltage overshooting, a voltage stress on the inverter switches Q2 and Q3 will also increase considerably and even exceed the rated value, which also bring an adverse effect on the switches Q2 and Q3's service life.

SUMMARY

In view of the above, the present disclosure relates to an electronic ballast for a lighting unit, and a lighting apparatus. The electronic ballast and the lighting apparatus substantially address one or more issues resulted from limitations and defects of the prior art.

Various embodiments provide an electronic ballast for a lighting unit, which employs a control circuit for startup of an inverter to control a startup sequence between the PFC circuit and the inverter, so that the problem that the output voltage does not meet the requirements due to the uncertainty of the startup sequence can be solved, and thereby the service life of the lighting unit such as a discharge lamp can be improved.

According to an aspect of the present disclosure, there is provided an electronic ballast for a lighting unit, which includes a Power Factor Correction (PFC) circuit, an inverter, and a control circuit for controlling startup of the inverter, wherein the control circuit is coupled between the PFC circuit and the inverter and includes: a switching device coupled in a startup loop for the inverter; a unidirectional conductive device coupled between a PFC power supply circuit for providing an operation current to a PFC controller of the PFC circuit and an input of the PFC controller, for preventing a startup current flowing through the PFC circuit from triggering the switching device; and a triggering device coupled to the switching device and a connection point between the unidirectional conductive device and the PFC power supply circuit, for controlling switch-on and -off of the switching device.

Preferably, the switching device is further coupled in an oscillation loop for the inverter.

In an embodiment, first and second reservoir capacitors coupled between the PFC circuit and the inverter are further included, wherein the second reservoir capacitor functions as a voltage source of the startup loop and the oscillation loop for the inverter.

In an embodiment, the PFC power supply circuit includes a secondary winding of a boost transformer, a capacitor, a resistor, a diode and a voltage stabilizing diode.

In an embodiment, the inverter is configured in a half-bridge form including first and second inverter switches, and a startup capacitor in the startup loop is charged by a startup current flowing through the startup loop of the inverter, so as to provide a startup voltage for initially activating the second inverter switch.

In an embodiment, the switching device includes a triac, a bipolar transistor or a field effect transistor.

In an embodiment, the triggering device includes a voltage stabilizing diode and a resistor which are connected in series or a capacitor.

In an embodiment, the unidirectional conductive device includes a diode or a thyristor.

The present disclosure also provides a lighting apparatus including the electronic ballast and a lighting unit which is driven by the electronic ballast to operate.

According to an embodiment of the present disclosure, the startup of the inverter can be made later than that of the PFC circuit by use of the controller, so that the output voltage can reach the rated value meeting the requirements for starting the discharge lamp, thereby prolonging the service life of the discharge lamp.

Further, by forcing the inverter to be started up after the output voltage of the PFC circuit is stabilized, the electronic ballast according to the embodiment of the present disclosure can prevent the inverter from being started up when the output voltage of the PFC circuit is in overshooting and thus causing the voltage on the inverter switch beyond the rated value, thereby protecting the inverter switch.

In addition, the startup loop and the oscillation loop for the inverter can be cut off by the controller, and thus the electronic ballast according to the embodiment of the present disclosure can prevent the startup loop for the inverter from being started up again due to remaining electricity energy in the reservoir capacitor after power is cutoff and the apparatus is shutdown and the oscillation loop from operating again to cause twinkling.

BRIEF DESCRIPTION OF THE DRAWINGS

From the following descriptions of the subject matter of the present disclosure, the preferred embodiments thereof and accompany drawings, the above and other objects, characteristics and advantages of the present disclosure will be apparent. In the accompany drawings.

DETAILED DESCRIPTION

Figure 1:
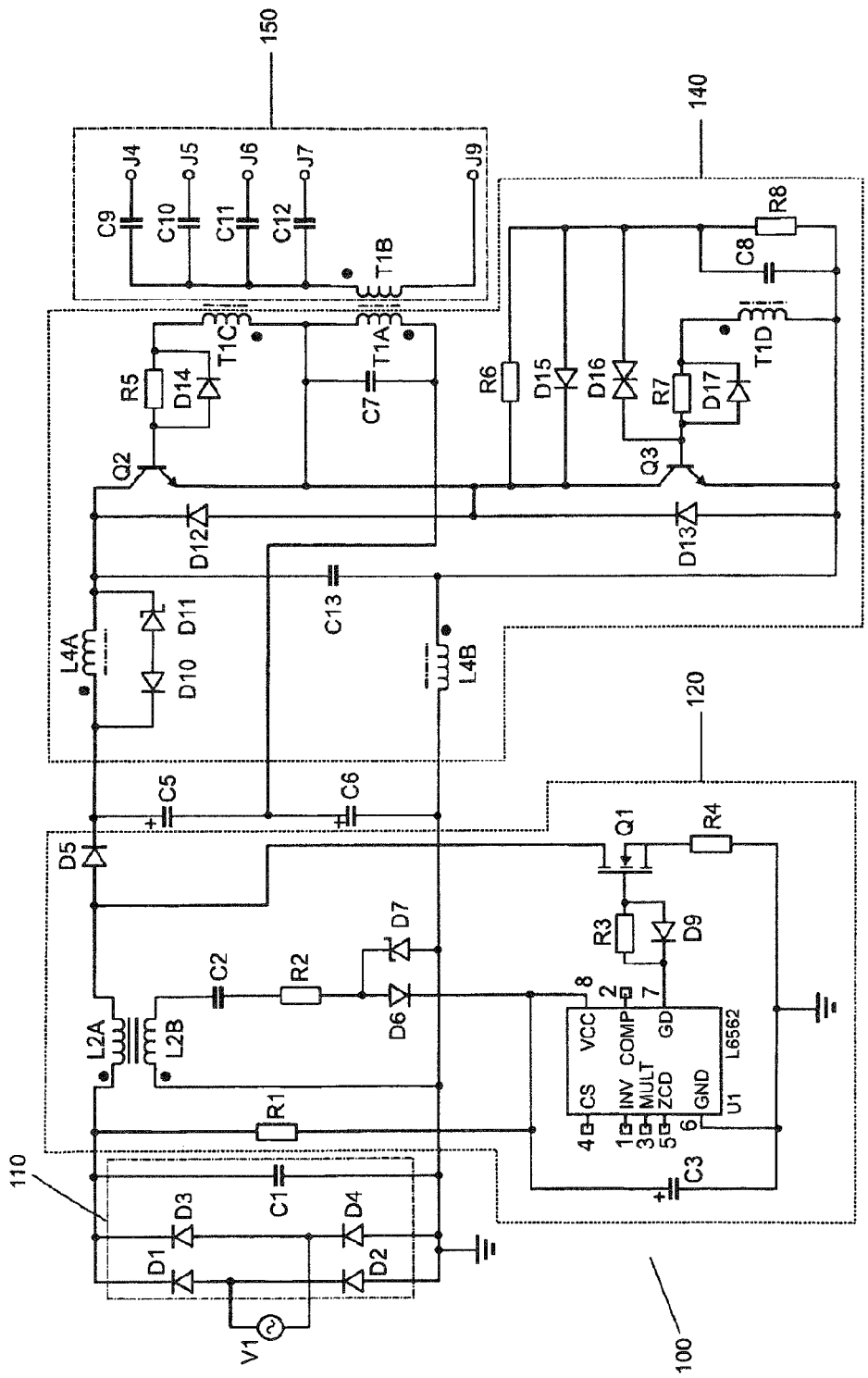
FIG. 1 is a schematic diagram illustrating an electronic ballast circuit of the prior art.

In the following, the preferred embodiments of the present disclosure will be described in detail with reference to the accompany drawings. It is noted that in this specification and the accompany drawings, the same or similar reference numerals are used to indicate constitutive elements having substantially the same or similar functions and constitutions, and repeated explanation for such constitutive elements is omitted.

Hereinafter, features of the present disclosure are described with specific embodiments.

Figure 2:
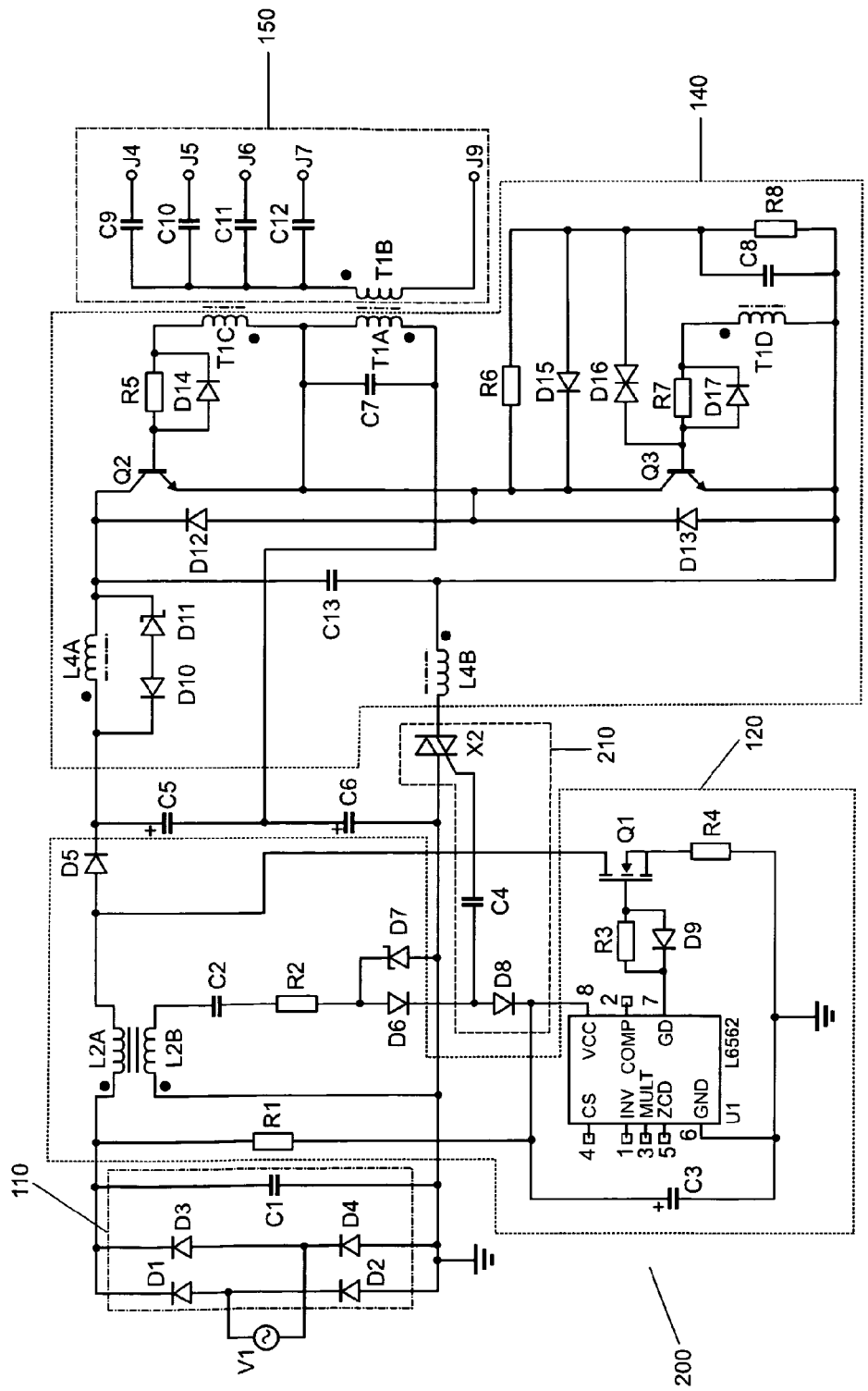
FIG. 2 is a schematic diagram illustrating an electronic ballast circuit according to an embodiment of the present disclosure.

FIG. 2 is a schematic diagram illustrating an electronic ballast circuit 200 according to an embodiment of the present disclosure. Since other circuits than a control circuit 210 for startup of an inverter 140 in a half-bridge form are identical to that shown in FIG. 1, repeated explanation is omitted herein and only differences from FIG. 1 are described.

As shown in FIG. 2, a control circuit 210 for startup of the inverter 140 includes a switching device such as a triac X2, a triggering device (e.g. a capacitor C4) for providing a signal for triggering the switching device and a unidirectional conductive device (e.g. a blocking diode D8).

The switching device is coupled in a startup loop (the reservoir capacitor C6—the secondary winding T1A of a transformer—the resistor R6—the startup capacitor C8 of the inverter 140—a conductor coil L4B—the reservoir capacitor C6) for the inverter 140, so as to control switch-on and -off of the startup loop for the inverter 140. Preferably, the switching device is also coupled in an oscillation loop (the reservoir capacitor C6—the secondary winding T1A—the inverter switch Q3—the conductor coil L4B—the reservoir capacitor C6) for the half-bridge, so as to control switch-on and -off of the oscillation loop for the half-bridge. In another embodiment, the switching device can be a bipolar transistor or a field effect transistor.

The triggering device is coupled to a control terminal of the switching device, so as to control switched-on and -off of the switching device. In another embodiment, the triggering device can be made up of a voltage stabilizing diode and a resistor connected in series.

The unidirectional conductive device is coupled between a PFC power supply circuit, which is composed of the secondary winding L2B, the capacitor C2, the resistor R2, the diode D6 and the voltage stabilizing diode D7, and an input VCC of a PFC controller U1, so as to present the startup current flowing through the PFC circuit from triggering the triac X2 through the resistor R1 in advance.

In the following, an operation process of the electronic ballast circuit 200 including the control circuit 210 for startup of the inverter 140 according to the embodiment of the present disclosure will be described in detail in combination with FIG. 2.

First, an input voltage (e.g. a rectified sine wave) is provided, and the input voltage charges a PFC power-supply capacitor C3 through a resistor R1. Due to the blocking diode D8, this startup current cannot trigger the triac X2, and the triac X2 remains in a switch-off state. Therefore, the startup loop for the inverter 140 is cut off, and in such a case, the inverter 140 cannot be started up.

Then, a PFC circuit 120 is started up normally, and thereafter, the PFC power supply circuit begins to operate, so as to provide an operation current for the PFC controller U1. Part of the operation current triggers the triac X2 through the capacitor C4 and makes the triac X2 to be conducted, and thereby the startup loop for the inverter 140 and the oscillation loop for the half-bridge are switched on. In this way, the voltage across the reservoir capacitor C6 charges the startup capacitor C8 of the inverter 140 through the resistor R6, so as to start up the operation of the inverter 140. Further, charging time for the capacitor C8 is adjusted by adjusting the magnitude of the resistor R6, a resistor R8 and/or the startup capacitor C8 easily, the inverter 140 can be ensured to be started up after the output voltage of the PFC circuit 120 is stabilized.

Thereafter, the voltage across the startup capacitor C8 rises to the threshold voltage for activating the half bridge, and half-bridge starts to oscillate. Since the start of the half-bridge oscillation is later than the startup of the PFC circuit, the voltage of the output transformer can reach the rated value. The discharge lamp is triggered with the voltage having the rated value, and thus, such an issue that the startup time and startup current of the discharge lamp do not meet ANSI82.11 can be addressed. Also, since the half-bridge oscillation is started up after the PFC output voltage is stabilized, such an issue of over voltage across the inverter switch due to startup of the inverter 140 upon overshooting of the output voltage from the PFC circuit 120 can also be addressed. Therefore, the discharge lamp and the inverter switch can be protected effectively.

Finally, after the input voltage is cut off, the PFC circuit 120 stops operation. When the half bridge stops the oscillation, the current flowing through the oscillation loop for the half-bridge decreases to zero, and the triac X2 is switched off. At this time, since the PFC circuit 120 stopped operation, there is no high-frequency current flowing through the primary winding L2A and no power supply current flowing through the PFC power supply circuit. Then, the triac X2 without driving signal remains in the switch-off state, and the startup loop for the inverter 140 and the oscillation loop for the half-bridge are cut off by the triac X2. Therefore, the inverter switch Q3 cannot be started up again and cause twinkling due to the remaining charge in the reservoir capacitors C5 and C6.

In the above, the configuration and the basic operation principle of the electronic ballast are described with the gas discharge lamp as an example. Those skilled in the art can understand that the electronic ballast according to the present disclosure can also be used in other lighting units that need the startup sequence to be under control.

In addition, the present disclosure also provides a lighting apparatus including the electronic ballast and a lighting unit driven by the electronic ballast to operate.

Although the preferred embodiments of the present disclosure have been illustrated and described, it can be expected that those skilled in the art can devise various modifications of the present disclosure within the spirit and scope of the following claims.

The invention claimed is:

1. An electronic ballast for a lighting unit, comprising:
   a Power Factor Correction (PFC) circuit,
   an inverter, and
   a control circuit for controlling startup of the inverter,
   wherein the control circuit is coupled between the PFC circuit and the inverter and comprises:
   a switching device coupled in a startup loop for the inverter;
   a unidirectional conductive device coupled between a PFC power supply circuit for providing an operation current to a PFC controller of the PFC circuit and an input of the PFC controller for preventing a startup current flowing through the PFC circuit from triggering the switching device; and
   a triggering device coupled to the switching device and a connection point between the unidirectional conductive device and the PFC power supply circuit for controlling switch-on and switch-off of the switching device.

2. The electronic ballast according to claim 1, wherein the switching device is further coupled in an oscillation loop for the inverter.

3. The electronic ballast according to claim 2, further comprising:
   first and second reservoir capacitors coupled between the PFC circuit and the inverter,
   wherein the second reservoir capacitor functions as a voltage source of the startup loop and the oscillation loop for the inverter.

4. The electronic ballast according to claim 1,
wherein the PFC power supply circuit comprises a secondary winding of a boost transformer, a capacitor, a resistor, a diode and a voltage stabilizing diode.

5. The electronic ballast according to claim 1,
wherein the inverter is configured as a half-bridge form including first and second inverter switches, and a startup capacitor in the startup loop is charged by a startup current flowing through the startup loop for the inverter so as to provide a startup voltage for initially activating the second inverter switch.

6. The electronic ballast according to claim 1,
wherein the switching device comprises any one of a triac, a bipolar transistor and a field effect transistor.

7. The electronic ballast according to claim 1,
wherein the triggering device comprises a voltage stabilizing diode and a resistor which are connected in series or a capacitor.

8. The electronic ballast according to claim 1,
wherein the unidirectional conductive device comprises a diode or a thyristor.

9. A lighting apparatus, comprising:
an electronic ballast, comprising:
   a Power Factor Correction (PFC) circuit,
   an inverter, and
   a control circuit for controlling startup of the inverter,
   wherein the control circuit is coupled between the PFC circuit and the inverter and comprises:
     a switching device coupled in a startup loop for the inverter;
     a unidirectional conductive device coupled between a PFC power supply circuit for providing an operation current to a PFC controller of the PFC circuit and an input of the PFC controller for preventing a startup current flowing through the PFC circuit from triggering the switching device; and
     a triggering device coupled to the switching device and a connection point between the unidirectional conductive device and the PFC power supply circuit for controlling switch-on and switch-off of the switching device;
a lighting unit which is driven by the electronic ballast to operate.

10. The lighting apparatus according to claim 9,
wherein the lighting unit is a gas discharge lamp.

* * * * *